United States Patent
Waugh et al.

(10) Patent No.: US 11,523,076 B2
(45) Date of Patent: *Dec. 6, 2022

(54) HIGH SPEED TWO-DIMENSIONAL EVENT DETECTION AND IMAGING USING AN ANALOG INTERFACE AND A MASSIVELY PARALLEL PROCESSOR

(71) Applicant: The Regents of the University of Colorado, a body corporate, Denver, CO (US)

(72) Inventors: Justin Waugh, Boulder, CO (US); Daniel S. Dessau, Boulder, CO (US); Stephen P. Parham, Broomfield, CO (US); Thomas Nummy, Boulder, CO (US); Justin Griffith, Littleton, CO (US); Xiaoqing Zhou, Longmont, CO (US); Haoxiang Li, Boulder, CO (US)

(73) Assignee: Regents of the University of Colorado, a body corporate, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/340,049

(22) Filed: Jun. 6, 2021

(65) Prior Publication Data

US 2021/0293979 A1  Sep. 23, 2021

Related U.S. Application Data

(63) Continuation of application No. 16/494,733, filed as application No. PCT/US2018/023146 on Mar. 19, 2018, now Pat. No. 11,032,498.

(60) Provisional application No. 62/472,719, filed on Mar. 17, 2017.

(51) Int. Cl.
| | |
|---|---|
| *H04N 5/361* | (2011.01) |
| *H04N 5/235* | (2006.01) |
| *H04N 5/351* | (2011.01) |
| *H04N 5/3745* | (2011.01) |

(52) U.S. Cl.
CPC ........... *H04N 5/361* (2013.01); *H04N 5/2351* (2013.01); *H04N 5/351* (2013.01); *H04N 5/3745* (2013.01)

(58) Field of Classification Search
CPC ...... H04N 5/361; H04N 5/2351; H04N 5/351; H04N 5/3745; H04N 5/232; H04N 5/225; H04N 5/335
See application file for complete search history.

(56) References Cited

U.S. PATENT DOCUMENTS

| | | | | |
|---|---|---|---|---|
| 4,948,975 A | * | 8/1990 | Erwin | G01N 21/76 250/361 C |
| 5,485,530 A | * | 1/1996 | Lakowicz | G01K 11/20 382/133 |
| 6,031,892 A | * | 2/2000 | Karellas | A61B 6/4258 250/370.11 |

(Continued)

*Primary Examiner* — Nhan T Tran
(74) *Attorney, Agent, or Firm* — Macheledt Bales LLP; Jennifer L. Bales

(57) ABSTRACT

A quantitative pulse count (event detection) algorithm with linearity to high count rates is accomplished by combining a high-speed, high frame rate camera with simple logic code run on a massively parallel processor such as a GPU or a FPGA. The parallel processor elements examine frames from the camera pixel by pixel to find and tag events or count pulses. The tagged events are combined to form a combined quantitative event image.

17 Claims, 6 Drawing Sheets

(56) References Cited

U.S. PATENT DOCUMENTS

| | | | |
|---|---|---|---|
| 11,032,498 B2* | 6/2021 | Waugh | H04N 5/225 |
| 2016/0268119 A1* | 9/2016 | Nakagawa | H01J 37/285 |
| 2017/0014646 A1* | 1/2017 | Lee | A61B 6/4258 |
| 2017/0067739 A1* | 3/2017 | Siercks | G01C 15/002 |
| 2017/0086762 A1* | 3/2017 | Kawata | G01T 1/2985 |

* cited by examiner

HIGH SPEED TWO-DIMENSIONAL EVENT DETECTION AND IMAGING USING AN ANALOG INTERFACE AND A MASSIVELY PARALLEL PROCESSOR

This application is a continuation of application Ser. No. 16/494,733, filed 16 Sep. 2019, which is a national stage entry of PCT/US18/23146, filed 19 Mar. 2018, which claims priority from application 62/472,719, filed 17 Mar. 2017.

This invention was made with government support under grant number DE-FG02-03ER46066 awarded by the U.S. Department of Energy. The government has certain rights in the invention.

BACKGROUND OF THE INVENTION

Field of the Invention

The present invention relates to high-speed and high-resolution two-dimensional event detection and imaging in a system with an analog interface. In particular, the present invention relates to pulse counting individual electrons, photons, and the like from event-type data.

Discussion of Related Art

Detection of particles such as electrons in two dimensions generally utilizes an analog interface such as a multichannel plate (MCP) detector for amplification, a phosphor screen to generate light, and a CCD camera or the like to record the light. For example, angle resolved photoemission spectroscopy (ARPES) experiments use an electron detection scheme based on a multi-channel plate/phosphor screen/camera stack. The camera is usually a CCD type, run in gray-scale mode integrating the analog photon intensity. Because a single spectrum usually requires hundreds of thousands of counts, the system must integrate count intensity for a total image, which is a very slow process not able to produce usable data in anything close to real time. In addition, the resultant data is the camera readout summed together. This has the inherent problem of adding up camera noise and readout noise, phosphor blooming artifacts, and general non-linear responses of the detection stack. It is also nearly impossible to count individual events because of overlap.

FIG. 1 (Prior art) shows an ARPES setup for detecting electrons from a sample 100 via electron optics 104. Electrons 102 are amplified by an MCP 106, converted to light by phosphor plate 108, and captured by a CCD or the like 110. FIG. 2 (Prior Art) illustrates the conventional event detection and recording process more generally. Incident event 102 is detected and amplified by MCP 106, generating amplified event 107. Phosphor plate 108 converts amplified event 107 into light 109. High quality camera 210 records the light 206 and generates an integrated output image 212.

Because MCP 106 and phosphor plate 108 have varying gain levels for each pulse and phosphor plate 108 may bloom and have a nonlinear gain profile with intensity, the output 109 in such cases may suffer from reduced resolution and fidelity. Generally, camera 210 records an image over a period of time (such as 30 seconds) and captures a number of events in an integrated output image 212. Researchers have been working on improving the quality of camera 210 in order to account for non-linearities and resolve individual events. Such cameras are extremely photosensitive and often require cooling. Thus, they are inconvenient to use and very expensive, and even with their very high resolution and advanced numerical methods it can be impossible to resolve individual events. Researchers have tried slowing down the experiments in order to reduce the number of events in an image, but this results in decaying of the sample over time as well as longer acquisition times.

Another method for counting events uses delay line detectors. These systems are even more expensive and are limited in scale.

A need remains in the art for apparatus and methods to perform high-speed and high-resolution two-dimensional detection of individual events, sometimes called pulse counting, in a system with an analog interface.

SUMMARY OF THE INVENTION

It is an object of the present invention to perform high-speed and high-resolution two-dimensional pulse counting in a system with an analog interface. The present invention improves the processing part of the stack to produce higher speed data with better linearity while using a simpler and faster camera. Event-style electron or photon data (as, for example, generated by MCP-phosphor pair) is sent into the camera. The camera is very high speed (high fps), but only moderate quality (lower dynamic range and higher noise floor compared to scientific cameras). Instead of (e.g.) 30 second exposures to create an integrated analog image, the camera captures a series of frames (e.g. ~100 frames per second), which are transferred to the parallel processor via the computer. On the parallel processor unit, each frame is processed by many parallel processor elements. The system includes a computer for overall processing and a massively parallel processor such as a GPU.

A parallel processor element examines each pixel in a frame using an algorithm to determine whether an event occurred at that pixel. This is essentially a binary test—the pixel is either on (for an event) or off (for no event).

There are several options for the algorithm, each with their own processing time and fidelity. In one embodiment, the parallel processor element examines the (e.g.) eight pixels around the pixel in question to determine whether that pixel is a local intensity maximum. The algorithm can include various other logical tests as well. In some preferred embodiments, a dark image is subtracted from the frames before they are processed. As long as the total processing time per frame is smaller than the frame refresh time (1/frame rate) the system will be able to keep up with data acquisition in real-time.

After all events are identified in a frame, a processed frame is formed. This is not a high-resolution image showing Gaussian shapes, but rather a map showing where events occurred, with "1" signifying an event and "0" signifying no event. These processed frames are then summed together, either on the parallel processor unit or the CPU, to get a combined quantitative image of pulse counted events. In this quantitative image, the value at each pixel corresponds to the number of events that occurred at that pixel over the time period covered by the summed processed frames.

This quantitative image is then sent back to the CPU (if it was generated on the parallel processor) for visualization, storage, or further accumulation.

The method of forming a quantitative two-dimensional image based upon incident events representing individual incident particles, in real time includes the steps of detecting incident events, amplifying detected events with an analog amplifier, converting the detected amplified events to light with a light generating element having a decay time (optional in some configurations), capturing image frames of the light at a frame rate on the order of the light generating element decay time, processing each frame pixel by pixel with a massively parallel processor and identifying valid events in individual image frames, and combining valid events to form the quantitative two-dimensional image.

The massively parallel processor might be a GPU. In preferred embodiments, a dark image is subtracted from captured image frames before frame processing.

Steps performed by the GPU might include comparing each pixel in a current frame to a corresponding pixel in a previous frame and disqualifying a pixel in the current frame as an event if the corresponding pixel in the previous frame was tagged as an event, determining if a pixel is the brightest in its region, determining if the brightness of the pixel is above a hot pixel threshold, and only identifying the pixel as a valid event if it passes some or all of these tests. In some cases, the GPU is further configured to combine individual processed frames to form event images prior to the general processor forming the quantitative two-dimensional image from the event images. In other cases, individual processed frames are the event images that are combined by the general processor.

The analog amplifier might comprise a microchannel plate detector (MCP), and the light generating element might be a phosphor plate.

In some preferred embodiments, the detector generates image frames at a rate of at least 100 frames per second, and the massively parallel processor is formed of at least 1000 parallel processing elements. The detector might be a CMOS camera which generates frames at a rate on the order of the decay time of the phosphor layer.

BRIEF DESCRIPTION OF THE DRAWINGS

FIG. 5A shows a time-series of frames before processing. FIG. 5B shows the frames with events tagged. FIG. 5C shows a combined event map.

DETAILED DESCRIPTION OF THE INVENTION

Figure 1:
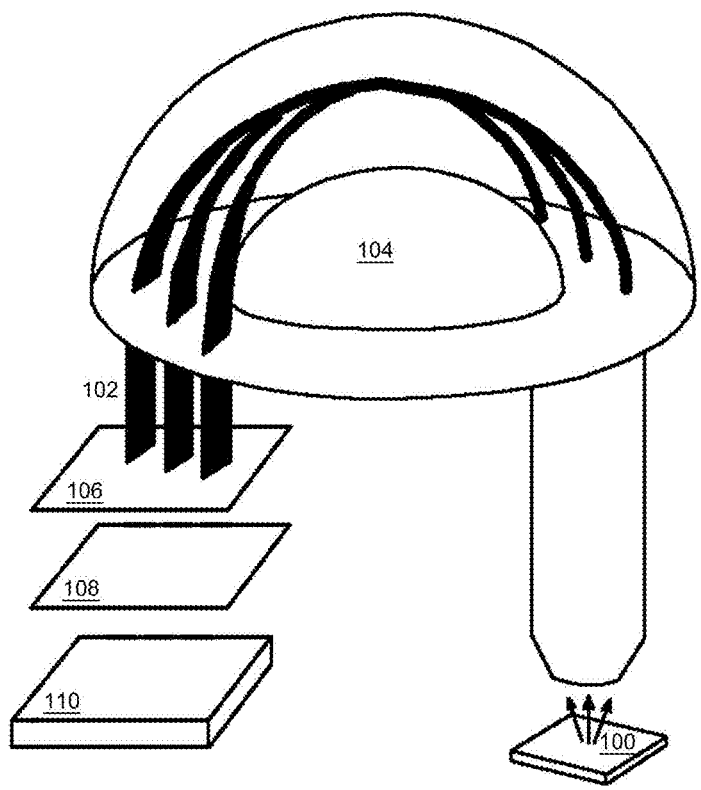
FIG. 1 (Prior Art) is a schematic diagram of an ARPES system for event detection.
Figure 2:
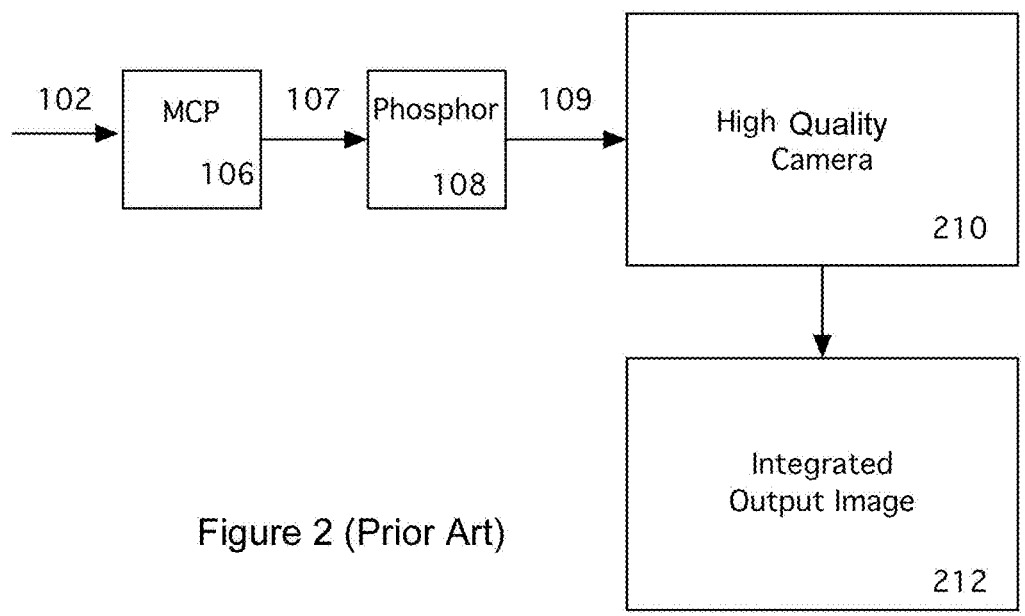
FIG. 2 (Prior Art) is a block diagram of a conventional event detection and recording system.
Figure 3:
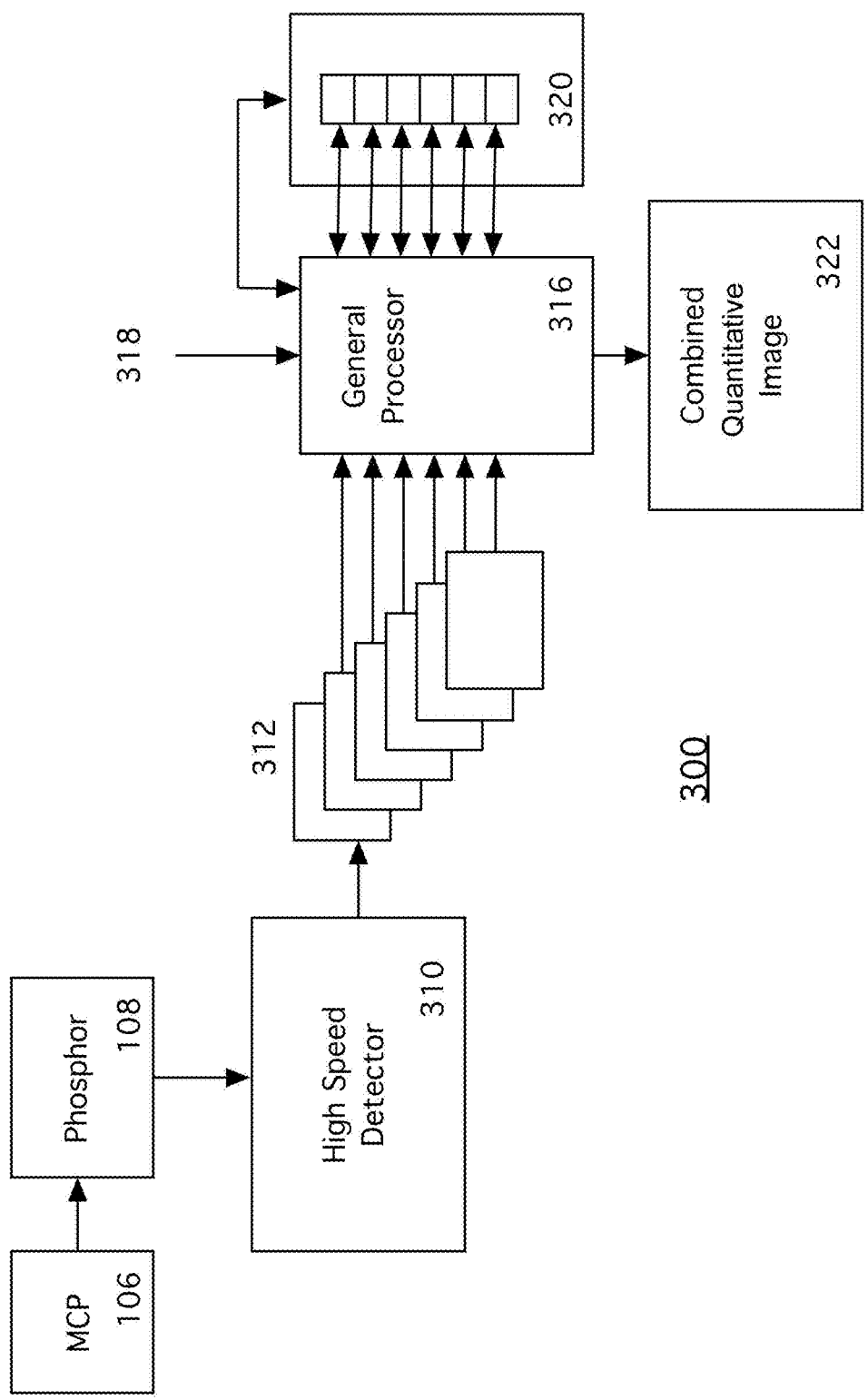
FIG. 3 is a block diagram illustrating a two-dimensional high-speed event counting system according to the present invention.

FIG. 3 is a schematic block diagram illustrating one embodiment 300 of a system for high-speed high-resolution two-dimensional event detection in a system with an analog interface. Event-style photon data (or electron data or the like) from sample 100 is generated by an analog layer such as a MCP 106 and phosphor plate 108 and sent to high-speed detector 310. In preferred embodiments, a Flea3 or a Grasshopper3 from ptgrey.com can be used. Both are CMOS cameras. The Grasshopper3 has 2.3 MP resolution at 163 FPS. The Flea3 has 1.3 MP resolution at 150 fps. In a preferred embodiment, data travels via USB3 (a cable interface fast enough to provide live/real-time data to general processor 316). Image frames 312 are stored in memory, and then sent to the massively parallel processor 320 (e.g. GPU memory) for processing. Image frames 312 are sent serially.

Note that it is possible for a CCD 310 to directly detect electron bursts from an MCP 106, such that phosphor layer 108 is omitted.

The general processor 316 manages the data (frames 312) from the USB3 serial port. It stores the data in memory and then sends that data from main memory to GPU memory 320, where each frame gets processed pixel by pixel, distributed across many parallel processor elements (cores). An example of a massively parallel processor 320 that has been shown to work well is the Nvidia GTX 780 GPU (having 2304 cores, ~1 GHz clock, 6.0 Gbps memory speed, and 3 GB memory). General processor 316 might communicate with the GPU via PCIe V. 3.0, for fast, real-time processing. Note that if detector 310 is especially high-resolution, it might be sufficient to process a small group of pixels (e.g. 4) at once. Since the group is functionally a pixel, the term pixel by pixel still applies.

Once on the GPU 320, each pixel has the same algorithm run on it (any distributed calculation will offer similar scales of speedup) and this algorithm determines if the pixel was the center of an event or not. See FIG. 6 for an example algorithm performed by massively parallel processor 320. This embodiment of the algorithm also has an external control 318 (analog amplification on/off) which is part of the Take Dark Image step 706.

This algorithm runs (for a 2.3 MP camera) 2.3 million times per frame. (or 2.3 million times in ~6 milliseconds). When distributed across hundreds of parallel processor elements such as cores, each core needs only run the algorithm on the order of thousands of times rather than millions in these 6 milliseconds. Once every pixel has been processed, and events identified, a processed frame is formed. In this processed frame, each pixel is either a "1", signifying an event, or a "0", signifying no event. As new frames come in, they are processed and added to previous processed frames, eventually forming a combined quantitative image 322. In this combined quantitative image 322, the value at each pixel corresponds to the number of events that occurred at that pixel. This image addition can occur on general processor 316 or massively parallel processor 320. Eventually a combined quantitative event image 322 is provided to the user. If desired, combined quantitative image 322 is stored or sent back to general processor 316 for post-processing as well. These processes are shown and described in more detail below.

In general, the event size is system dependent, so camera 310 resolution is preferably chosen such that an event is spanned across a few pixels (e.g. a 7×7 pixel grid encompasses an event). If the resolution is too low, an event may look like a hot pixel, and not have enough of a shape to discriminate from noise. Too high resolution is slower, and can result in events being spread out too much, resulting in a lower intensity that can get lost in the noise.

Camera 310 frame rate is preferably chosen to be on the order of the phosphor decay rate (note that there are a variety of available phosphors available, with widely varying decay rates). If the frame rate is too low then each frame will collect many events. These events will therefore have a higher likelihood of appearing near each other than if a higher camera frame-rate was utilized, thus more likely causing saturation as the algorithm could incorrectly classify the image intensity of multiple events as a single event.

However, a complication occurs if the camera frame rate is too high. If the frame rate is faster than the decay time of the phosphor, then the same event is likely to show up in multiple frames, causing some double-counting issues. In the case that the dwell time of the camera is around 2 times the typical 90%-1% phosphor decay time of 2.6 ms, a dwell of 5 ms (or 200 fps) captures the events well. To remove the effect of double counting, a mask of a frame is stored for comparison to a subsequent frame. If both frames show an event at the same pixel, it is assumed that this is caused by the phosphor decay time rather than a new event. Such a masking routine to remove double counting has proven to be very effective. The mask can also be of multiple previous frames if necessary. For example, if the phosphor decay and frame rate combination results in a decent chance of a single event spanning three frames, the mask would include the previous two frames for rejecting double counts. In that case the dwell time might be around 3 times the decay time. It is possible to account for the dwell time being longer than the decay time, but ideally the dwell time will be only several times the decay time to reduce ambiguity.

Figure 4:
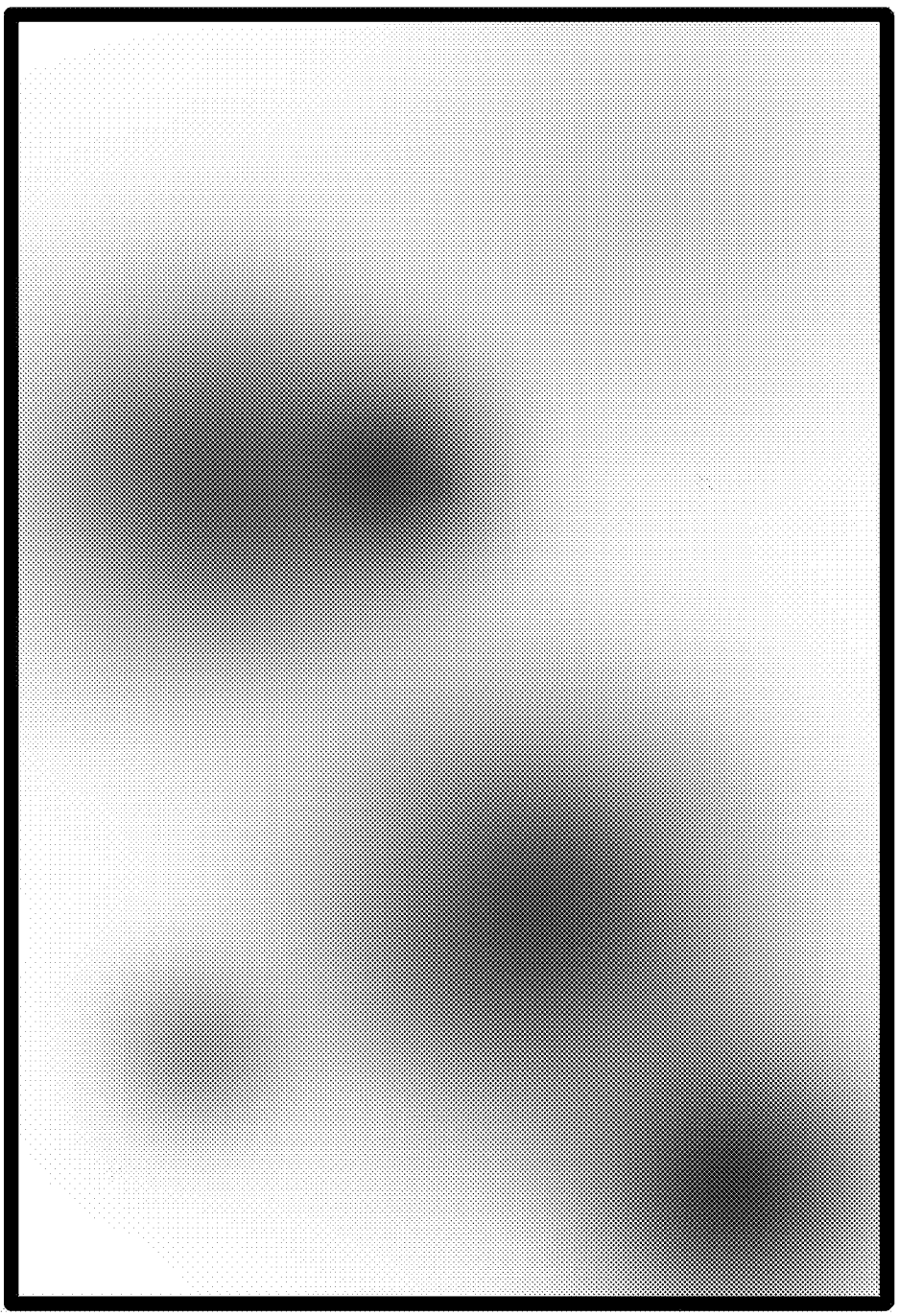
FIG. 4 (Prior Art) is a high-resolution image of the sort captured by a conventional event detection system.

FIG. 4 (Prior Art) is a high-resolution image of the sort captured by a conventional event detection system. This image includes seven imaged events, but it is difficult to resolve some of them because of overlap (and various sources of noise).

Figure 5A:
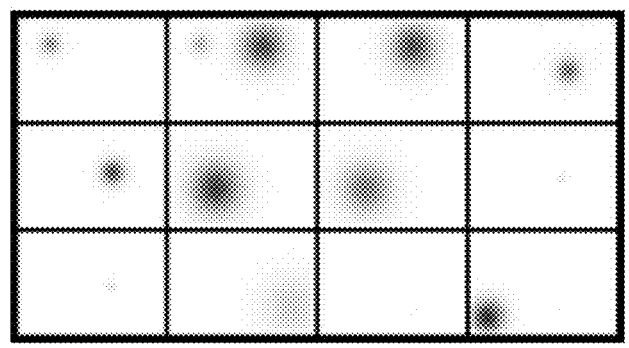
FIGS. 5A, 5B, and 5C are figures illustrating the process performed by the present invention.
Figure 5B:
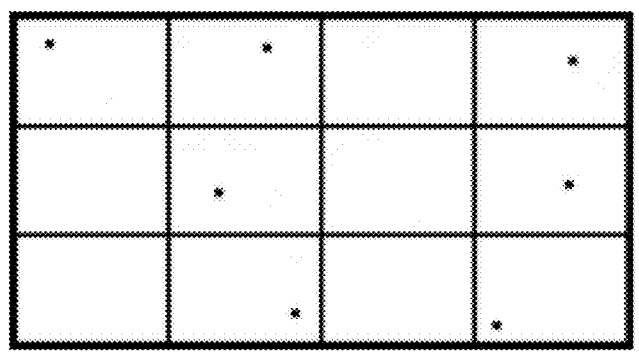
Figure 5C:
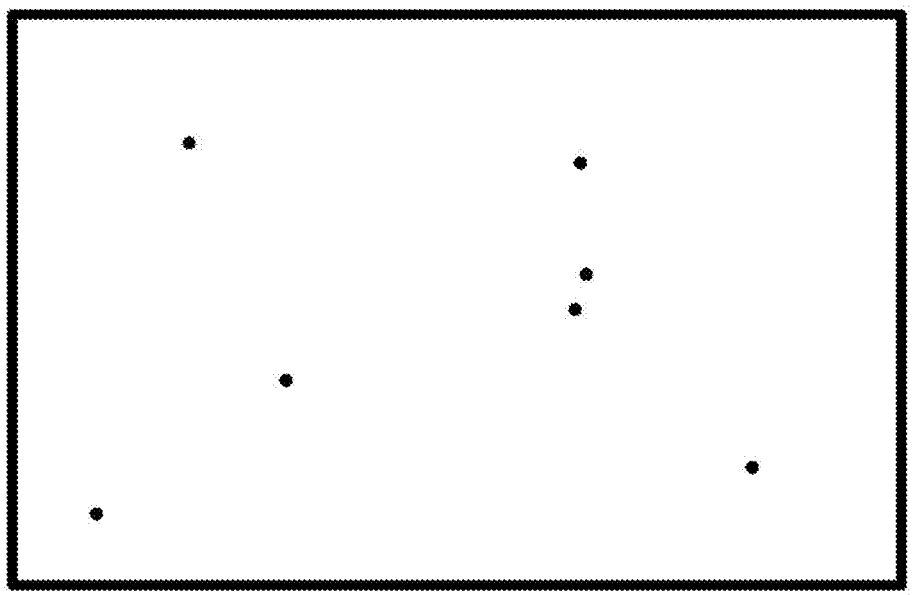

FIGS. 5A, 5B, and 5C are figures illustrating a simplified example of the process performed by the present invention. FIG. 5A shows a time-series of frames before processing. Note that the same event shows up in successive frames on occasion, and not every frame includes events. It is possible for two events to be captured in the same frame as well. Experiments have shown that the present invention removes the blooming effect of phosphor found in conventional systems which integrate the intensity over time.

FIG. 5B shows the processed frames, with events identified as dots. A discrete dot is used to identify each event. FIG. 5B also illustrates the part of the algorithm that rejects double-counted events. There is a dimmer event on frame 2 in the same location as frame 1, seen in FIG. 5A, but the event is only counted once in FIG. 5B.

FIG. 5C shows a combined quantitative image 322. Note that seven events were detected and appear in FIG. 5C. Compare to the image of FIG. 4, where overlap would make it difficult to resolve all seven events even with high-powered signal processing. For illustrative purposes, the seven events in the quantitative image of FIG. 5C are in different locations, so the image only contains 1's and 0's. However, typically the quantitative image will have values larger than 1, representing multiple events that occurred at the same location but were separated in time (by more than one frame since those would be classified as double-counts.)

Figure 6:
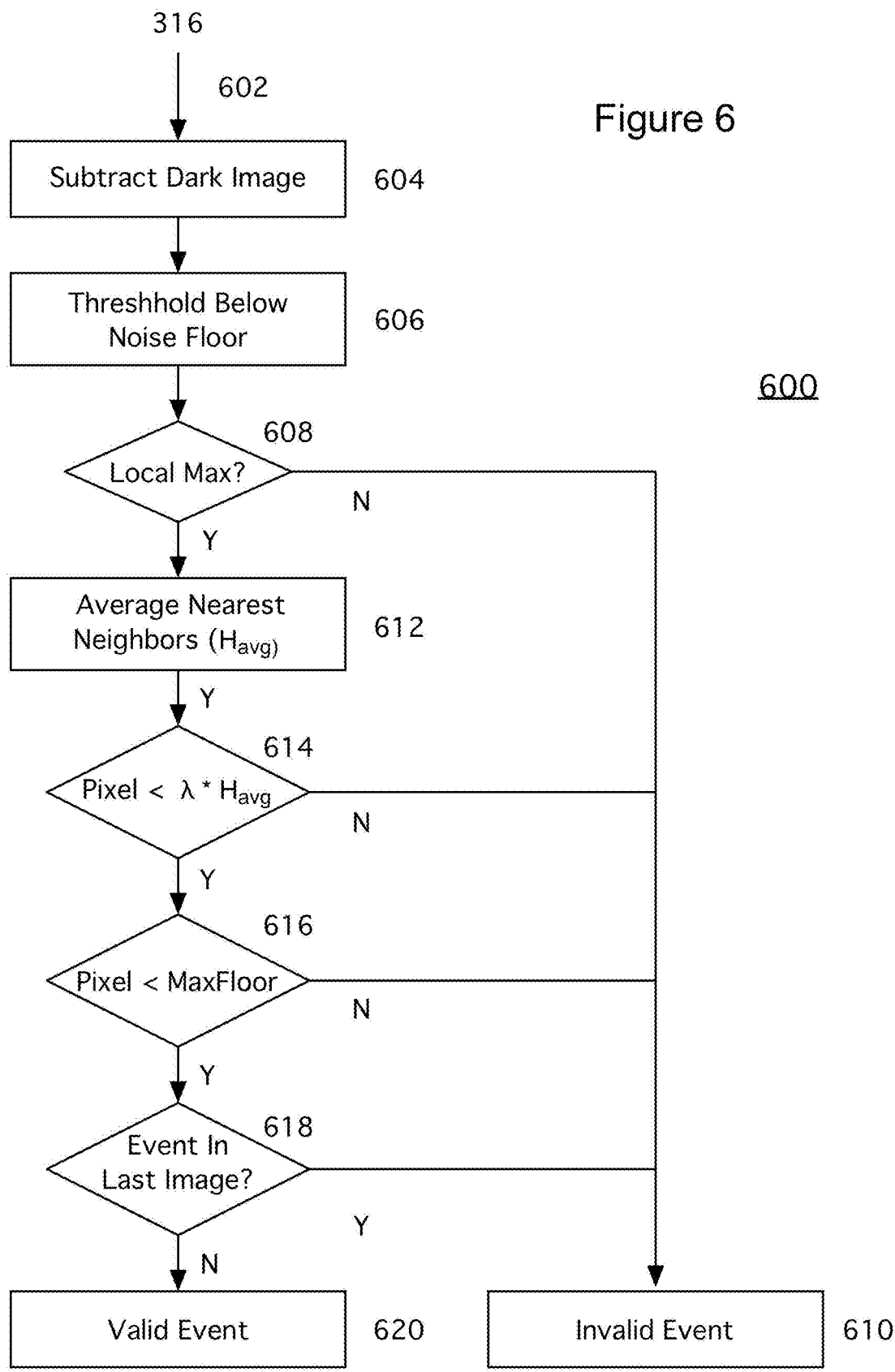
FIG. 6 is a flow diagram illustrating an embodiment of the process performed by a parallel processor element according to the present invention.
Figure 7:
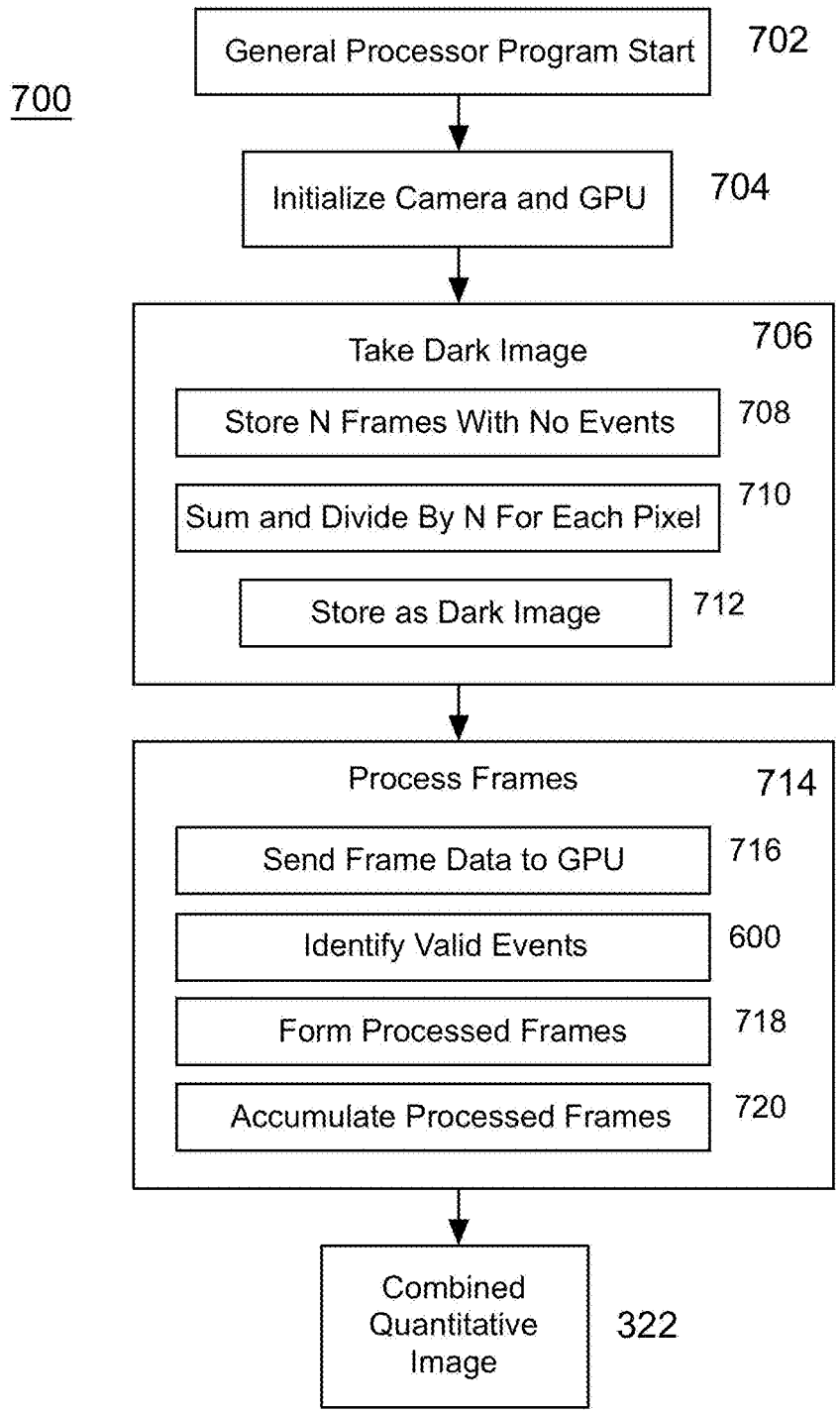
FIG. 7 is a flow diagram illustrating an embodiment of the entire process according to the present invention.

FIGS. 6 and 7 illustrate example processes performed by an embodiment of the present invention. This process converts from the analog light signal to discriminated events in a true quantitative pulse counting algorithm which is capable of keeping up with the rate of events in (for example) ARPES experiments. A high-speed CMOS camera along with massively parallel processing allows this high data volume to be processed in real time, so that imagery is available as the experiment is being run.

FIG. 6 is a flow diagram illustrating an embodiment of valid event identification 600 including pre-processing steps and the parallel processing steps performed by the GPU or other massively parallel processor 320 on frames 312. In this embodiment of the algorithm, the noise floor was set empirically based on camera. A was found empirically to be ~2.5. The maximum floor is set empirically based on the detector.

Pre-processing is done for each frame as it arrives in step 602. Step 604 subtracts a dark image (see step 706 in FIG. 7) from each frame. This removes a base camera signal when the analog amplification 106 is turned off which is switched by control 318. This step also removes any leakage light reaching the camera not generated by the analog amplification 106. Step 606 thresholds any count below a noise floor in the resulting subtracted frame image. This further removes readout noise and shot noise of the (e.g.) CMOS camera 310 not removed in step 604. The noise floor is generally set empirically based on the camera.

With pre-processing steps 604 and 606 applied to each frame, parallel processing begins. Pulse detection uses the highly parallel nature of (in this example) a GPU. Modern GPUs have on the order of 1000 cores. When divided over all 2 million pixels each core only needs to process 2000 pixels in a few milliseconds between each frame. Each parallel processing element, or core, has the task of evaluating a group of pixels, one at a time. After a core has completed processing a pixel, it moves to another pixel to repeat the pulse detection algorithm. Simple and fast logic allows each core to complete its processing of all the pixels in a frame before the next frame comes in for that core. For each individual pixel in a frame, event detection proceeds as follows. An FPGA would also work well.

Step 608 determines whether the pixel is the center of an event by checking if it is a local maximum (if not, reject pixel as not center of event). Step 612 is a hot pixel test which removes pixels that are local maxima, but not of the Gaussian shape of an actual event. It averages the intensities of the center pixel's 8 nearest neighbors to find $H_{avg}$. Step 614 checks whether the pixel intensity is more than $\lambda$ times $H_{avg}$ (if yes, reject pixel as hot pixel). A was found empirically to be ~2.5.

The analog amplification stack 106, 108 is susceptible to spurious events, such as cosmic rays, which generally have much higher intensities than actual events. Step 616 removes such events by checking if the max intensity of the pixel is less than a maximum floor (if not, reject pixel as cosmic ray). The maximum floor is set empirically based on the detector.

If the pixel passes all of these tests, it provisionally qualifies as an event. Step 618 checks whether there was an identified event at the same pixel location in the previous frame. If yes, the event is considered redundant due to the phosphor decay time spanning across multiple frames and is not identified again. If not, step 620 identifies the event as a valid event. If any of the above tests are not passed, step 610 indicates the pixel is not a valid event.

In some embodiments, identified event pulses are summed into an integrated frame by the massively parallel processor 320, and after some set number of N frames, the summed image is returned to general processor 316. The result is a new effective frame of pulse counted output. Here, the intensity of each pixel is the actual event count for that channel. This summation may also be performed by general processor 316 as shown in FIG. 3.

FIG. 7 is a flow diagram 700 illustrating an embodiment of the entire process. This embodiment performs three main functions: background removal and signal threshold (optional but useful in some applications), pulse detection, and processed frame formation.

In step 702, the process begins on general processor 316. Step 704 initializes camera 310 and massively parallel processor 320. Step 706 captures a background (dark) image to be subtracted from frames 312 in order to reduce noise. In this embodiment, step 708 stores N frames with no events, step 710 sums and divides by N for each pixel, and step 712 stores the result as dark image 706. For example, dark image data may be integrated for one second in step 708.

Next is process 714 of capturing frames 312, processing them on massively parallel processor 320, combining processed frames 718, and forming combined quantitative image 322 (see FIG. 3). Step 716 brings in frames of data sequentially to general processor 312 and sends them to massively parallel processor 320. Step 600 comprises the process shown in FIG. 6, which determines valid events and generates event locations. Step 718 produces processed frames. Step 720

Accumulates these processed frames to form combined quantitative image 322. In some cases, massively parallel processor 320 combines several processed frames to form an event image. Then general processor 316 combines the event images to form combined quantitative image 322. If massively parallel processor 320 forwards individual processed frames to general processor 316, those comprise the event images combined by general processor 316.

The embodiment shown is a simplified example (trivially parallel) as the algorithm runs the same for each pixel and can run start-to-finish with no intermediate syncing. Other possible features include running a low-pass convolution first, and then running some peak-fitting rather than just local max finding. As features, some extra calibration steps (beyond just the background subtraction) can be added. Some pulse-characterization for non-linear correction coefficients can also be utilized.

While the exemplary preferred embodiments of the present invention are described herein with particularity, those skilled in the art will appreciate various changes, additions, and applications other than those specifically mentioned, which are within the spirit of this invention.

The invention claimed is:

1. A method of forming a quantitative two-dimensional image based upon incident events representing individual incident particles, in real time, comprising the steps of:
   (a) detecting incident events representing individual incident particles
   (b) amplifying detected events with an analog amplifier;
   (c) converting the detected amplified events to light with a light generating element having a decay time;
   (d) capturing image frames of the light at a frame rate on the order of the light generating element decay time;
   (e) processing each frame pixel by pixel with a FPGA and identifying valid events in individual image frames;
   (f) combining valid events to form the quantitative two-dimensional image.

2. The method of claim 1 further including the step of subtracting a dark image from captured image frames prior to performing step (e).

3. The method of claim 1 wherein step (e) comprises the step of
   (e1) comparing each pixel in a current frame to a corresponding pixel in a previous frame and disqualifying a pixel in the current frame as an event if the corresponding pixel in the previous frame was tagged as an event.

4. The method of claim 3 wherein step (e) comprises the steps of:
   (e2) determining if a pixel is the brightest in its region and disqualifying it as an event if it is not;
   (e3) determining if the brightness of the pixel is above a hot pixel threshold, and disqualifying it as an event if it is; and
   (e4) identifying the pixel as a valid event if it was not disqualified.

5. The method of claim 3 wherein step (e) is performed in a massively parallel manner.

6. The method of claim 3 wherein:
   step (e) includes the step of:
      forming individual processed frames from current frames; and
      combining several processed frames to form event images; and wherein
   step (f) includes the step of:
      combining event images.

7. The method of claim 3 wherein:
   step (e) includes the step of forming individual event images from current frames; and
   step (f) includes the step of combining event images.

8. An apparatus for forming a quantitative two-dimensional image based upon incident events representing individual incident particles, in real time, comprising:
   an analog amplifier configured to amplify incident particles;
   a detector for detecting an amplified incident particle signal and generating image frames based on the signal;
   a general processor; and
   a massively parallel processor;
   wherein the general processor is configured to receive the image frames and transmit image frame data to the massively parallel processor; and
   wherein the massively parallel processor is configured to process each frame pixel by pixel and to identify valid events in individual image frames and process frames to generate event images in real time;
   and wherein the general processor is further configured to combine event images to form the quantitative two-dimensional image.

9. The apparatus of claim 8, wherein the analog amplifier comprises a microchannel plate detector (MCP).

10. The apparatus of claim 9 further comprising a phosphor plate configured to convert the output of the MCP into light which forms the amplified incident particle signal.

11. The apparatus of claim 8 wherein the massively parallel processor is further configured to combine processed frames to form event images prior to the general processor forming the quantitative two-dimensional image.

12. The apparatus of claim 8 wherein the massively parallel processor is an FPGA.

13. An apparatus for forming a quantitative two-dimensional image based upon incident events representing individual incident particles, in real time, comprising:
   an analog amplifier configured to amplify incident particles;
   a converter configured to convert the amplified incident particles to light;
   a detector for detecting the light and generating image frames at a rate of at least about 100 frames per second based on the light;
   a general processor; and
   an FPGA formed of at least about 1000 parallel processing elements;
   wherein the general processor is configured to receive the image frames and transmit image frame data to the massively parallel processor; and
   wherein the FPGA is configured to process each frame pixel by pixel and to identify valid events in individual image frames and process frames to generate event images in real time;

and wherein the general processor is further configured to combine event images to form the quantitative two-dimensional image.

14. The apparatus of claim 13 wherein each parallel processing element is configured to compare each pixel in a current frame to a corresponding pixel in a previous frame and disqualify a pixel in the current frame as an event if the corresponding pixel in the previous frame was tagged as an event.

15. The apparatus of claim 14 wherein each parallel processing element is configured to:
   determine if a pixel is the brightest in its region and disqualify it as an event if it is not;
   determine if the brightness of the pixel is above a threshold, and disqualify it as an event if it is; and
   identifying the pixel as a valid event if it was not disqualified.

16. The apparatus of claim 13 wherein the detector is a CMOS camera.

17. The apparatus of claim 16 wherein the converter comprises a phosphor layer and wherein the CMOS camera generates frames at a rate on the order of a decay time of the phosphor layer.

* * * * *